US012808472B2

(12) United States Patent
Hasunuma

(10) Patent No.: US 12,808,472 B2
(45) Date of Patent: Nov. 24, 2026

(54) FLUID TRANSFERRING CONNECTOR

(71) Applicant: Surpass Industry Co., Ltd., Gyoda (JP)

(72) Inventor: Masahiro Hasunuma, Saitama (JP)

(73) Assignee: SURPASS INDUSTRY CO., LTD., Gyoda (JP)

( * ) Notice: Subject to any disclaimer, the term of this patent is extended or adjusted under 35 U.S.C. 154(b) by 28 days.

(21) Appl. No.: 18/930,110

(22) Filed: Oct. 29, 2024

(65) Prior Publication Data

US 2025/0146607 A1 May 8, 2025

(30) Foreign Application Priority Data

Nov. 8, 2023 (JP) ................................ 2023-190680

(51) Int. Cl.

*F16L 37/00* (2006.01)
*F16L 37/18* (2006.01)
*F16L 37/32* (2006.01)
*F16L 37/35* (2006.01)
*F16L 37/34* (2006.01)
*F16L 37/62* (2006.01)

(52) U.S. Cl.

CPC ............ *F16L 37/35* (2013.01); *F16L 37/002* (2013.01); *F16L 37/18* (2013.01); *F16L 37/32* (2013.01); *F16L 37/34* (2013.01); *F16L 37/62* (2013.01); *Y10T 137/87917* (2015.04); *Y10T 137/87949* (2015.04); *Y10T 137/87957* (2015.04); *Y10T 137/87965* (2015.04)

(58) Field of Classification Search

USPC ........................ 251/149, 149.1, 149.6, 149.8

See application file for complete search history.

(56) References Cited

U.S. PATENT DOCUMENTS 4,114,638 A * 9/1978 Fournier ................ F16L 55/00 137/268
5,649,563 A * 7/1997 Shimano ................ F16K 1/446 137/240
6,719,270 B2 * 4/2004 Ozawa .................... F16L 41/16 285/308
7,887,023 B2 * 2/2011 Hasunuma ............. F16L 37/40 251/149.9

(Continued)

FOREIGN PATENT DOCUMENTS

JP 4986520 B2 7/2012

*Primary Examiner* — Matthew W Jellett

(74) *Attorney, Agent, or Firm* — McCormick, Paulding & Huber PLLC

(57) ABSTRACT

A fluid transferring connector includes a plug having a first valve part and a cylindrical first accommodation part; and a socket having a second valve part, a cylindrical second accommodation part, a first support part that supports the second accommodation part in a state where the second accommodation part is fixed with respect to an installation face, a plug insertion part into which the plug is inserted, a motion mechanism that moves the plug insertion part along the axis to perform switching between an open state and a closed state, and a second support part that supports the weight of the plug insertion part at a predetermined position on the axis of the plug insertion part, and the plug insertion part has a lock mechanism that fixes the plug so that the plug is not moved along the axis with respect to the plug insertion part.

4 Claims, 8 Drawing Sheets

(56) References Cited

U.S. PATENT DOCUMENTS

| | | | | |
|---|---|---|---|---|
| 8,628,119 | B2 * | 1/2014 | Hasunuma | F16L 37/34 285/276 |
| 10,352,492 | B2 * | 7/2019 | Hasunuma | F16K 17/04 |
| 2010/0001517 | A1 | 1/2010 | Hasunuma | |

* cited by examiner

FLUID TRANSFERRING CONNECTOR

CROSS-REFERENCE TO RELATED APPLICATION

This application claims foreign priority benefits under 35 U.S.C. § 119 to Japanese Patent Application No. 2023-190680 filed on Nov. 8, 2023, the content of which is hereby incorporated by reference in its entirety.

BACKGROUND

1. Technical Field

The present invention relates to a fluid transferring connector.

2. Description of Related Art

Fluid transferring coupling devices for transferring a fluid from a pipe connected to a plug to a pipe connected to a socket by inserting the plug into the socket are conventionally known.

In a fluid transferring coupling device disclosed in Japanese Patent No. 4986520, the operator fixes a plug to a slider of a socket, then moves the slider by air pressure, and thereby causes a first valve on the socket side and a second valve on the plug side to come into contact with each other to allow the fluid to flow from the pipe on the plug side to the pipe on the socket side.

In the fluid transferring coupling device disclosed in Japanese Patent No. 4986520, the plug being inserted into the socket is supported by a plug support part arranged further front of the front end of the socket, thereby bending or breakage in a coupling portion between the plug and the socket is prevented, and a fluid is stably supplied.

In the fluid transferring coupling device disclosed in Japanese Patent No. 4986520, however, the plug support part supports the plug at a position where the plug is not inserted into the socket. Thus, bending or breakage may occur at the coupling portion between the plug and the socket due to weights of the plug and the fluid flowing therein that are located on the socket side from the plug support part and even due to weights of the pipe connected to the plug and the fluid flowing therein.

The present invention has been made in view of such circumstances and intends to provide a fluid transferring connector that can stably supply a fluid without causing bending or breakage in a coupling portion between a plug and a socket.

SUMMARY

The present invention employs the following solutions in order to achieve the object described above.

A fluid transferring connector according to the first aspect of the present invention includes: a plug configured to be attached to an end of a first pipe, a fluid is allowed to flow through the first pipe; and a socket configured to be connected to a second pipe, the plug being inserted into the socket, and a fluid flowing in from the first pipe is allowed to flow out to the second pipe. The plug has a first valve part and a cylindrical first accommodation part that accommodates the first valve part to be movable along a first axis. The socket has a second valve part, a cylindrical second accommodation part that accommodates the second valve part to be movable along a second axis, a first support part that supports the second accommodation part in a state where the second accommodation part is fixed with respect to an installation face, a plug insertion part formed cylindrically so as to surround the second accommodation part, the plug being inserted into the plug insertion part, a motion mechanism configured to move the plug insertion part along the second axis toward or away from the second accommodation part to perform switching between an open state where the first valve part and the second valve part are in contact with each other and a closed state where the first valve part and the second valve part are not in contact with each other, and a second support part configured to support the weight of the plug insertion part at a predetermined position on the second axis of the plug insertion part, and the plug insertion part has a lock mechanism configured to fix the plug so that the plug is not moved along the second axis with respect to the plug insertion part.

According to the fluid transferring connector of the first aspect of the present invention, when the operator inserts the plug into the socket and operates the lock mechanism of the plug insertion part of the socket, the plug is fixed so as not to move along the second axis with respect to the plug insertion part. When the plug insertion part is moved toward the second accommodation part along the second axis by the motion mechanism with the plug being fixed in the plug insertion part, the first valve part of the plug and the second valve part of the socket come into contact with each other. Accordingly, a state where the fluid flows from the first pipe on the plug side to the second pipe on the socket side is obtained.

According to the fluid transferring connector of the first aspect of the present invention, the second accommodation part of the socket is supported by the first support part in a state where the second accommodation part is fixed with respect to the installation face. Further, the weight of the plug insertion part is supported at a predetermined position on the second axis of the plug insertion part by the second support part. Since the weight of the plug insertion part into which the plug is inserted is supported by the second support part, a fluid can be supplied stably without causing bending or breakage in the coupling portion between the plug and the socket compared to a case where the weight of the plug is supported at a position thereof not inserted into the socket. Further, since the plug insertion part of the socket and the second accommodation part are arranged on the same axis, friction that occurs when the plug insertion part is moved by the motion mechanism toward or away from the second accommodation part is reduced, the open state where the first valve part and the second valve part are in contact with each other is reliably held, and the fluid can be stably supplied from the plug to the socket.

Further, according to the fluid transferring connector of the first aspect of the present invention, even when the plug insertion part is moved along the second axis by the motion mechanism, the state where the predetermined position on the second axis of the plug insertion part is supported by the second support part is maintained. Thus, even when the center of gravity of the plug insertion part and the plug fixed to the plug insertion part is moved by the motion mechanism, the state where the weight of the plug insertion part is supported by the second support part is maintained, and the fluid can be supplied stably without causing bending or breakage in the coupling portion between the plug and the socket.

The fluid transferring connector according to the second aspect of the present invention is further configured as follows in the first aspect. That is, the motion mechanism moves the plug insertion part along the second axis toward or away from the second accommodation part by a pressure generated by a compressed gas.

According to the fluid transferring connector of the second aspect of the present invention, the operation of switching between the open state where the first valve part and the second valve part are in contact with each other and the closed state where the first valve part and the second valve part are not in contact with each other can be performed by a pressure generated by a compressed gas without requiring manual operation by the operator.

The fluid transferring connector according to the third aspect of the present invention is further configured as follows in the first aspect or the second aspect. That is, the second support part has at least one support shaft fixed to the installation face and arranged along a third axis parallel to the second axis, and the plug insertion part has at least one insertion hole extending along the third axis, the support shaft being inserted into the insertion hole.

According to the fluid transferring connector of the third aspect of the present invention, the weight of the plug insertion part can be transmitted from the insertion hole of the plug insertion part to the installation face via the support shaft inserted into the insertion hole.

The fluid transferring connector according to the fourth aspect of the present invention is further configured as follows in the third aspect. That is, the second support part has a plurality of support shafts, and the plug insertion part has a plurality of insertion holes.

According to the fluid transferring connector of the fourth aspect of the present invention, the weight of the plug insertion part can be transmitted from a plurality of insertion holes of the plug insertion part to the installation face via a plurality of support shafts inserted into the plurality of insertion holes. Further, compared to a case where a single support shaft is inserted into a single insertion hole, force can be prevented from acting in the direction in which the plug insertion part is rotated about the support shaft, and thereby the weight of the plug insertion part can be reliably transmitted to the installation face.

According to the present invention, a fluid transferring connector that can stably supply a fluid without causing bending or breakage in the coupling portion between a plug and a socket can be provided.

DETAILED DESCRIPTION

Figure 1:
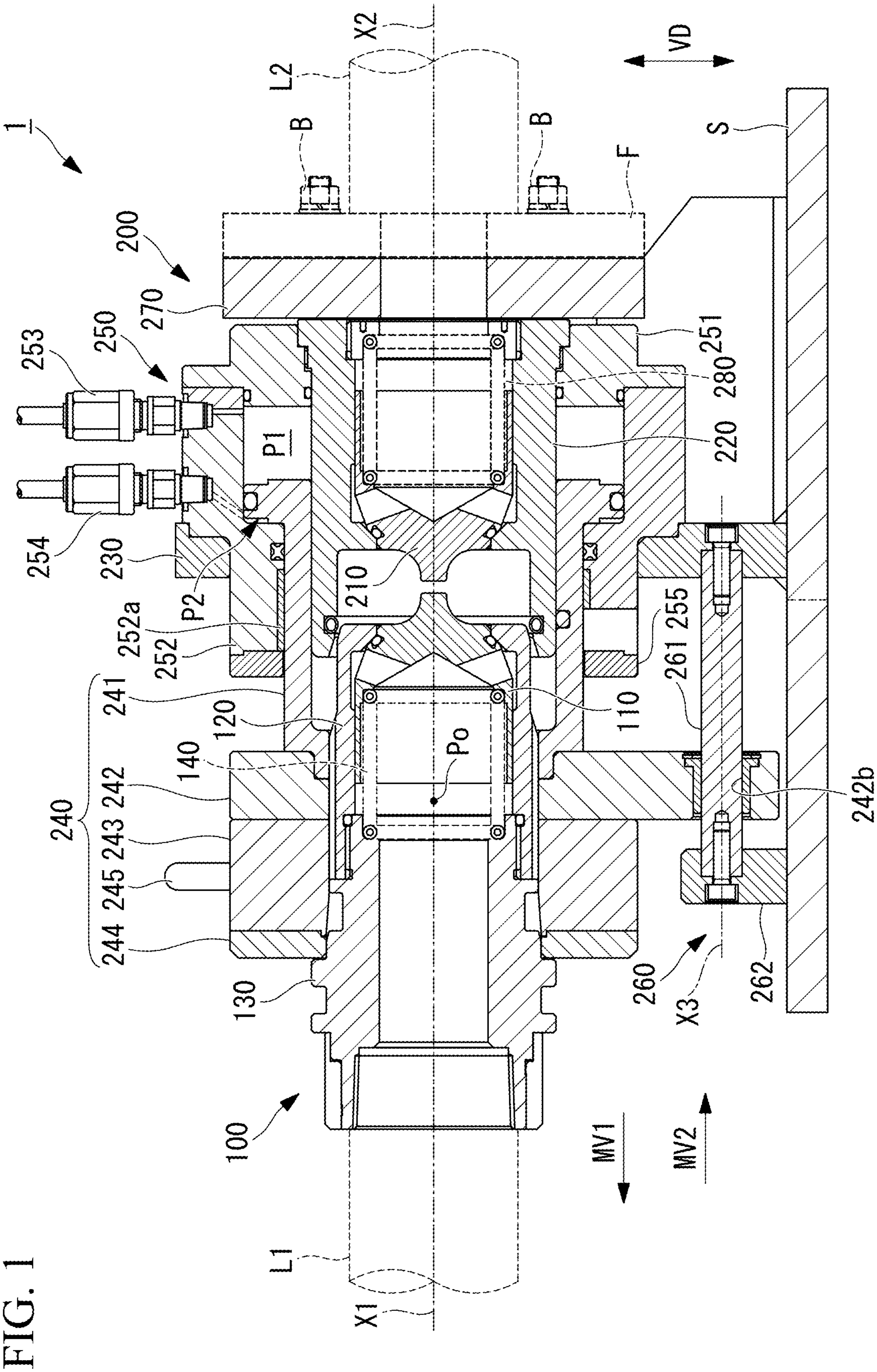
FIG. 1 is a longitudinal sectional view illustrating a fluid transferring connector according to one embodiment of the present invention and illustrates a closed state where a pipe on a plug side and a pipe on a socket side do not communicate with each other.
Figure 2:
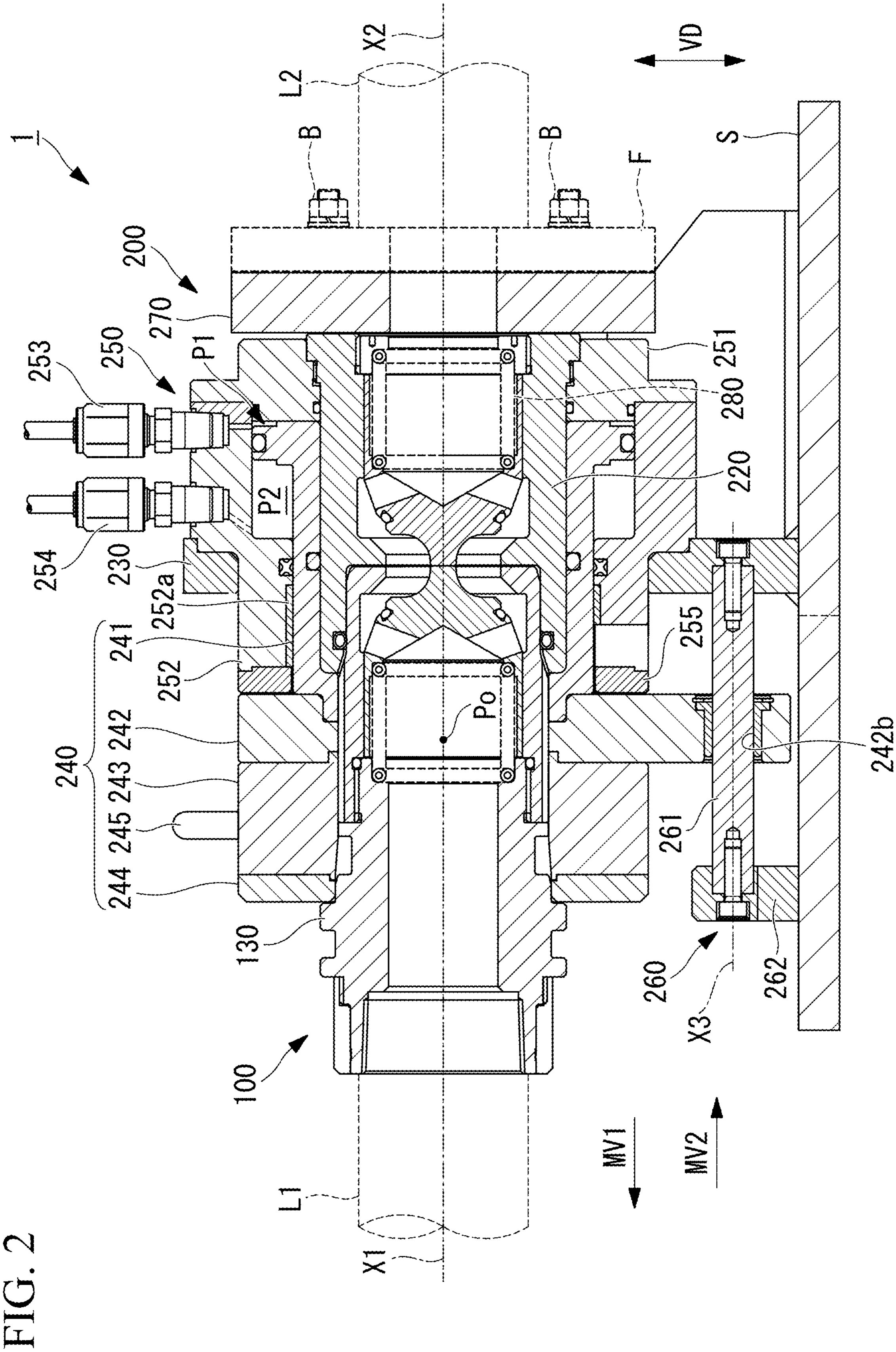
FIG. 2 is a longitudinal sectional view illustrating the fluid transferring connector according to one embodiment of the present invention and illustrates an open state where the pipe on the plug side and the pipe on the socket side communicate with each other.
Figure 3:
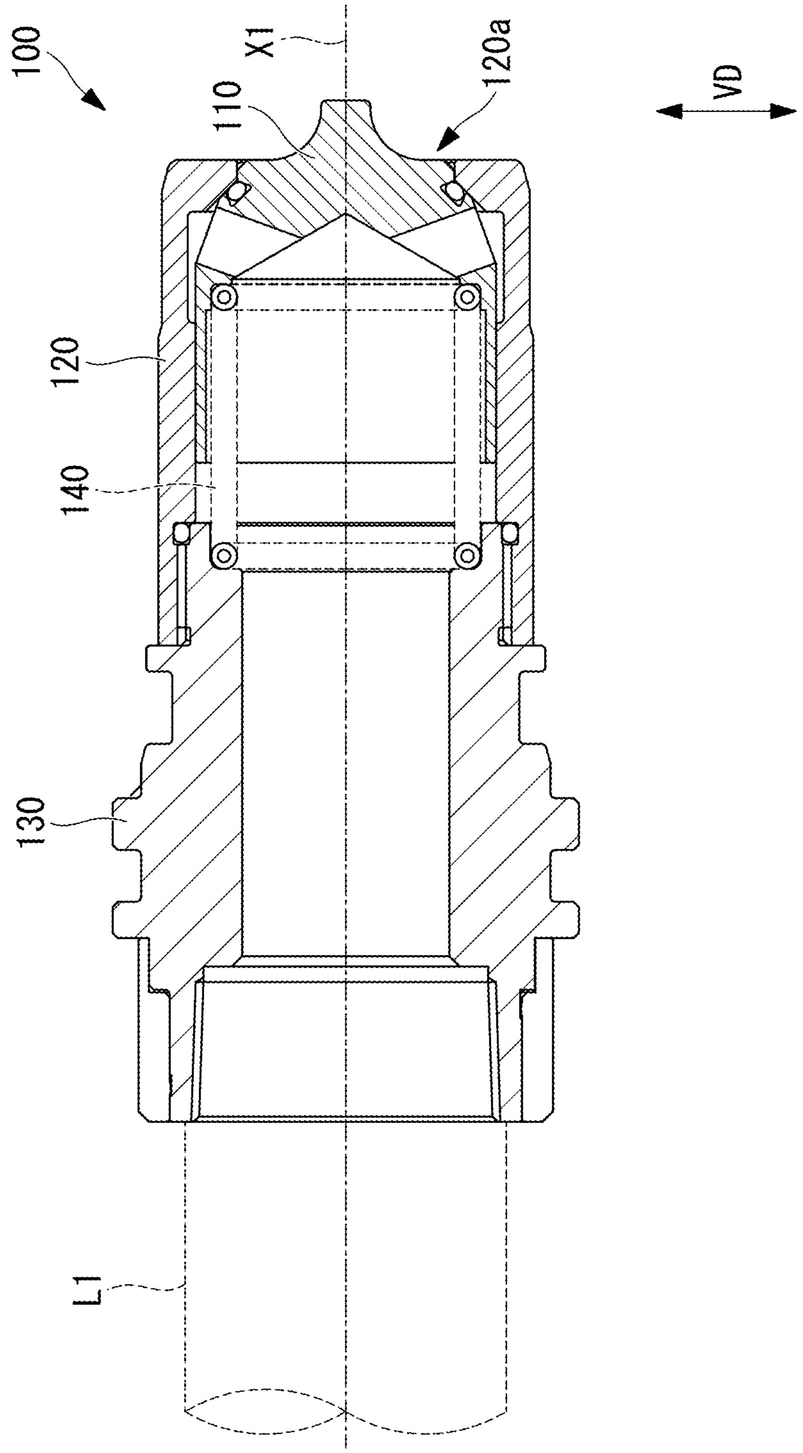
FIG. 3 is a longitudinal sectional view of the plug illustrated in FIG. 1.
Figure 4:
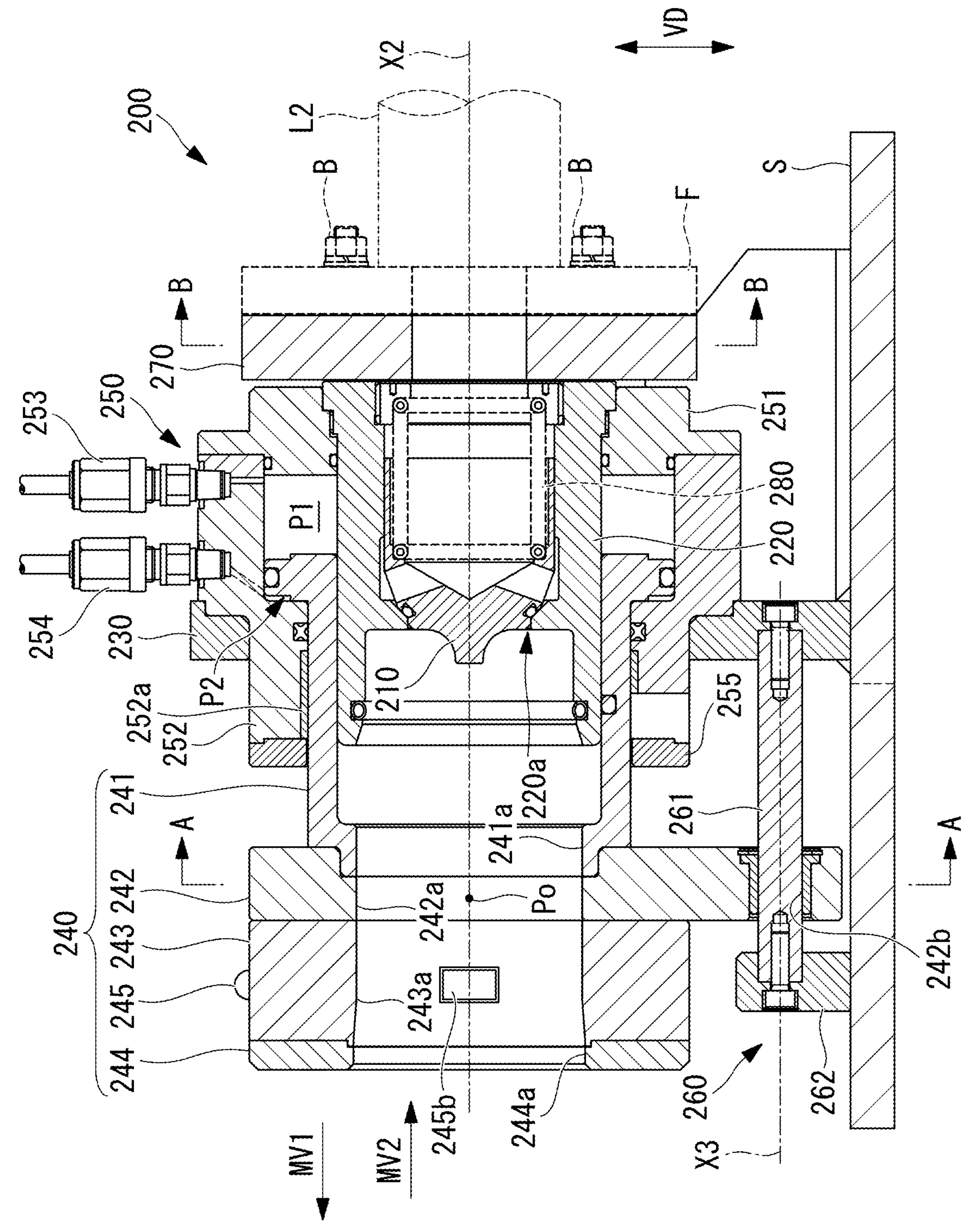
FIG. 4 is a longitudinal sectional view of the socket illustrated in FIG. 1.

One embodiment of a fluid transferring connector 1 according to the present invention will be described below with reference to the drawings. FIG. 1 is a longitudinal sectional view illustrating the fluid transferring connector 1 according to one embodiment of the present invention and illustrates a closed state where a pipe L1 on a plug 100 side and a pipe L2 on a socket 200 side do not communicate with each other. FIG. 2 is a longitudinal sectional view illustrating the fluid transferring connector 1 according to one embodiment of the present invention and illustrates an open state where the pipe L1 on the plug 100 side and the pipe L2 on the socket 200 side communicate with each other. FIG. 3 is a longitudinal sectional view of the plug 100 illustrated in FIG. 1. FIG. 4 is a longitudinal sectional view of the socket 200 illustrated in FIG. 1.

As illustrated in FIG. 1 and FIG. 2, the fluid transferring connector 1 according to one embodiment of the present invention includes, for example, the plug 100 that is attached to the end of the pipe (first pipe) L1 that allows a fluid to flow therethrough and the socket 200 that is connected to the end of the pipe (second pipe) L2 into which the plug 100 is inserted and to which a fluid flowing in from the pipe L1 is allowed to flow out.

When the plug 100 and the socket 200 are connected to each other, an incompressible fluid can flow in the fluid transferring connector 1. The incompressible fluid in the present embodiment is, for example, a liquid such as pure water or a chemical liquid used in semiconductor manufacturing devices. For example, the pipe L2 connected to a buffer tank installed to a building is connected to the socket 200. The plug 100 is attached to the end of the pipe L1 such as a hose guided from a tank truck, for example. Note that the form may be such that the plug 100 is connected to the pipe L2 and the socket 200 is connected to the pipe L1.

As illustrated in FIG. 1 to FIG. 3, the plug 100 has a first valve part 110, a first accommodation part 120, a first main body 130, and a first spring 140. The first accommodation part 120 is a member that accommodates the first valve part 110 to be movable along an axis X1 (first axis) and is formed cylindrically. The first main body 130 is a member extending along the axis X1 and formed cylindrically, the first accommodation part 120 is attached to one end of the first main body 130, and the pipe L1 is attached to the other end of the same.

The first main body 130 guides the fluid flowing in from the pipe L1 to the first accommodation part 120 in which the first valve disc 110 is accommodated. One end of the first spring 140 is attached to the end of the first main body 130 on the first accommodation part 120 side. The other end of the first spring 140 is attached to the first valve part 110. The first valve part 110 is pushed into against an opening hole 120*a* of the first accommodation part 120 by pushing force generated by the first spring 140. The first valve part 110 pushed into against the opening hole 120*a* closes the opening hole 120*a*, and thereby a closed state where no fluid flows through the opening hole 120*a* is obtained.

As illustrated in FIG. 1, FIG. 2, and FIG. 4, the socket 200 has a second valve part 210, a second accommodation part 220, a first support part 230, a plug insertion part 240, a motion mechanism 250, a second support part 260, a bypass flange 270, and a second spring 280. The second accommodation part 220 is a member that accommodates the second valve part 210 to be movable along an axis X2 (second axis) and is formed cylindrically.

As illustrated in FIG. 4, one end of the second spring 280 is attached to the end on the second accommodation part 220 side. The other end of the second spring 280 is attached to the second valve part 210. The second valve part 210 is pushed into against an opening hole 220*a* of the second accommodation part 220 by pushing force generated by the second spring 280. The second valve part 210 pushed into against the opening hole 220*a* closes the opening hole 220*a*, and thereby a closed state where no fluid flows through the opening hole 220*a* is obtained.

The first support part 230 is a member for supporting the second accommodation part 220 in a state where the second accommodation part 220 is fixed with respect to an installation face S. The first support part 230 is a member fixed to the installation face S and formed in a plate shape along the vertical direction VD. A through-hole holding the second accommodation part 220 so as to surround the second accommodation part 220 via the plug insertion part 240 and the motion mechanism 250 is formed in the first support part 230.

The plug insertion part 240 is a member that is formed cylindrically so as to surround the second accommodation part 220 and into which the plug 100 is inserted. The plug insertion part 240 has a cylindrical body 241, a support body 242, an accommodation body 243, a cover member 244, and a lock mechanism 245.

The cylindrical body 241 is a member formed cylindrically so as to extend along the axis X2. The cylindrical body 241 has the inner circumferential face arranged so as to surround the outer circumferential face of the second accommodation part 220. One end of the cylindrical body 241 (the left side end in FIG. 4) is connected to the support body 242. A through-hole 241*a* extending along the axis X2 is formed in the cylindrical body 241.

The support body 242 is a member formed in a plate shape along the vertical direction VD, which is a member supported by the second support part 260. A through-hole 242*a* extending along the axis X2 is formed in the support body 242. The accommodation body 243 is connected to the support body 242.

The accommodation body 243 is a member formed cylindrically so as to extend along the axis X2. A through-hole 243*a* extending along the axis X2 is formed in the accommodation body 243. The plate-like cover member 244 is attached to the accommodation body 243. A through-hole 244*a* extending along the axis X2 is formed in the cover member 244. The through-hole 241*a*, the through-hole 242*a*, the through-hole 243*a*, and the through-hole 244*a* form a through-hole into which the plug 100 is inserted.

The lock mechanism 245 is a mechanism for fixing the plug 100 and the plug insertion part 240 to each other so that the plug 100 is not moved along the axis X2 with respect to the plug insertion part 240. The plug 100 is fixed to the plug insertion part 240 by the lock mechanism 245 and thereby moved along the axis X2 together with the plug insertion part 240 by the motion mechanism 250.

Figure 5:
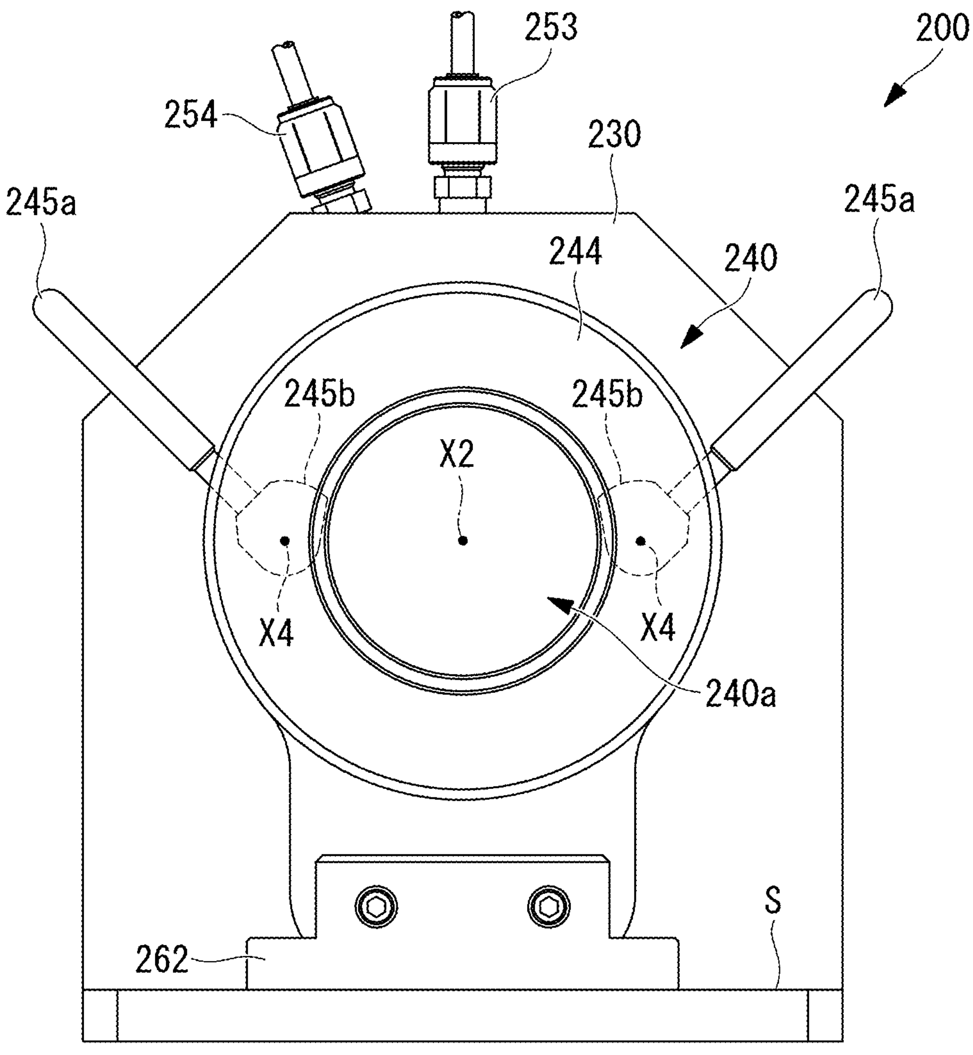
FIG. 5 is a left side view of the fluid transferring connector illustrated in FIG. 1, which is a diagram of a lock mechanism in an unfixed state.
Figure 6:
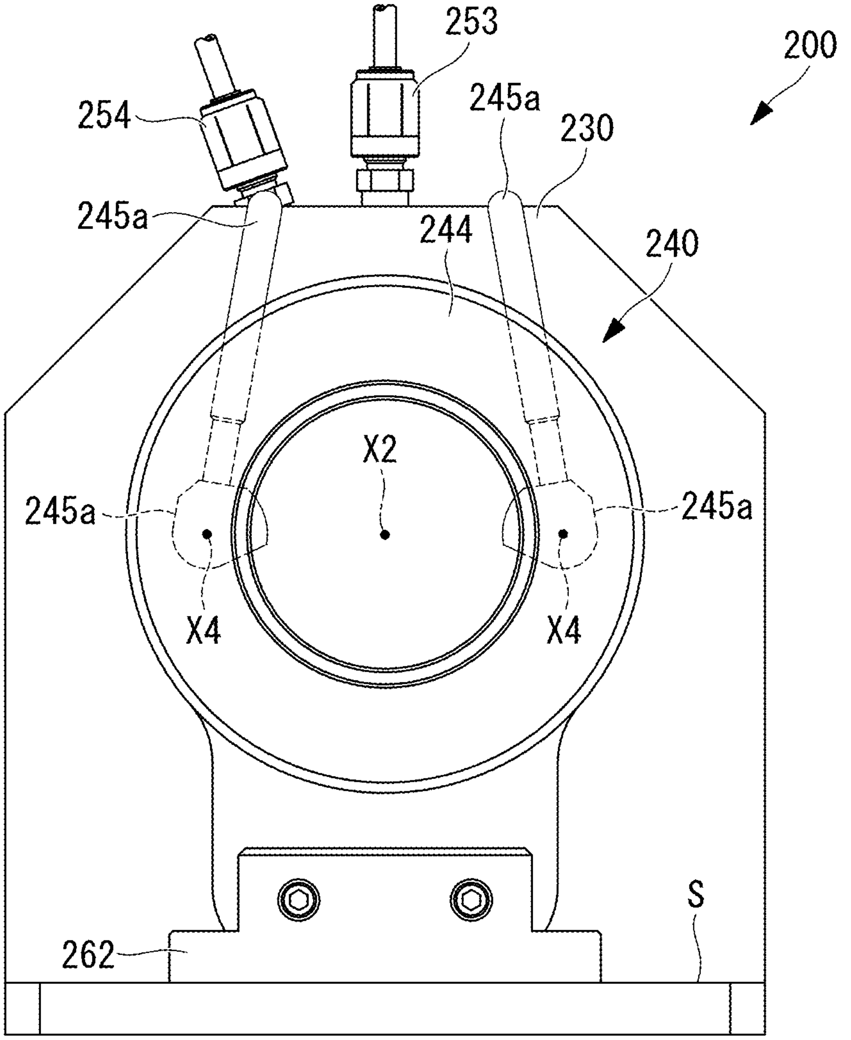
FIG. 6 is a left side view of the fluid transferring connector illustrated in FIG. 1, which is a diagram of the lock mechanism in a fixed state.

FIG. 5 is a left side view of the fluid transferring connector 1 illustrated in FIG. 1, which is a diagram of the lock mechanism 245 in an unfixed state. FIG. 6 is a left side view of the fluid transferring connector 1 illustrated in FIG. 1, which is a diagram of the lock mechanism 245 in a fixed state. The lock mechanism 245 has a pair of lever members 245*a* and a pair of lock members 245*b*.

The lock mechanism 245 swings each lever member 245*a* about each axis X4 to perform switching between an unfixed state where the lock member 245*b* does not protrude into a fluid flow path 240*a* centered on the axis X2 and a fixed state where the lock member 245*b* protrudes into the fluid flow path 240*a* centered on the axis X2. In FIG. 5 and FIG. 6, illustration of the plug 100 is omitted. A pair of engagement grooves (not illustrated) engaged with the lock members 245*b* are formed in the outer circumferential face of the plug 100.

The operator switches the lock mechanism 245 from the unfixed state to the fixed state with the plug 100 being inserted into the socket 200 to obtain a state where the lock members 245*b* are engaged with the engagement grooves of the plug 100. Accordingly, the plug 100 is fixed so as not to move along the axis X2 with respect to the plug insertion part 240.

The motion mechanism 250 is a mechanism for moving the plug insertion part 240 along the axis X2 toward or away from the second accommodation part 220 to perform switching between the open state where the first valve part 110 and the second valve part 210 are in contact with each other and the closed state where the first valve part 110 and the second valve part 210 are not in contact with each other. The motion mechanism 250 has an annular member 251, a cylindrical body 252, a first intake/exhaust port 253, a second intake/exhaust port 254, and a cover member 255.

A bearing member 252*a* formed of a resin material (for example, a fluoroplastic material) is attached to the inner circumferential face of the cylindrical body 252. The bearing member 252*a* has an effect of reducing friction between the outer circumferential face of the cylindrical body 241 and the inner circumferential face of the cylindrical body 252. The cover member 255 is a member formed annularly and attached to the end of the cylindrical body 252 by a fastening bolt (not illustrated) so that the state where the bearing member 252*a* is fixed to the inner circumferential face of the cylindrical body 252 is maintained.

The motion mechanism 250 supplies compressed air (compressed gas) from the first intake/exhaust port 253 to a first pressure chamber P1 to increase the pressure in the first pressure chamber P1 to be higher than the pressure in a second pressure chamber P2, and moves the plug insertion part 240 along a first motion direction MV1 (the direction from the right side to the left side in FIG. 4), and thereby the closed state illustrated in FIG. 1 is obtained.

Further, the motion mechanism 250 supplies compressed air (compressed gas) from the second intake/exhaust port 254 to the second pressure chamber P2 to increase the pressure in the second pressure chamber P2 to be higher than pressure in the first pressure chamber P1, and moves the plug insertion part 240 along a second motion direction MV2 (the direction from the left side to the right side in FIG. 4), and thereby the open state illustrated in FIG. 2 is obtained.

The second support part 260 is a member for supporting the weight of the plug insertion part 240 so that the axis X1 matches the axis X2 at a predetermined position Po on the axis X2 of the plug insertion part 240. The second support part 260 has a pair of support shafts 261 and a fixing part 262 for fixing one end of the support shaft 261 to the installation face S.

The support shaft 261 is a shaft-like member fixed to the installation face S via the fixing part 262 and the first support part 230 and arranged along a third axis (X3) parallel to the axis X2. The support shaft 261 is preferably formed of a metal material. One end of the support shaft 261 is fixed to the installation face S via the fixing part 262, and the other end of the support shaft 261 is fixed to the installation face S via the first support part 230.

Figure 7:
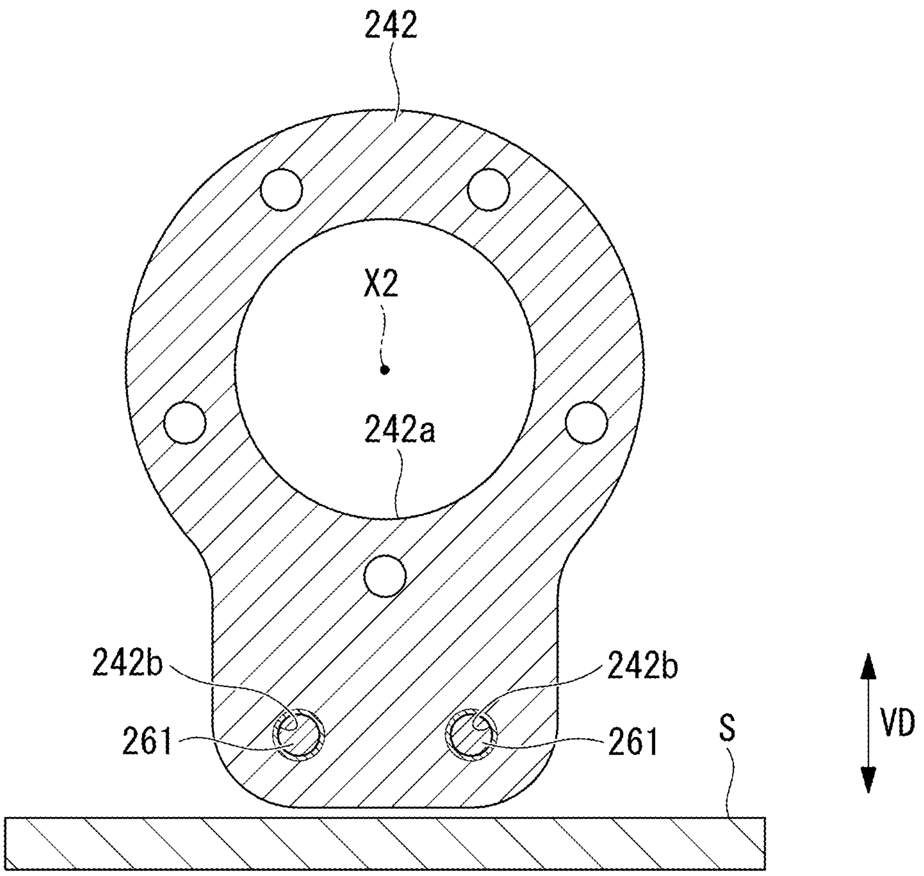
FIG. 7 is an arrow A-A sectional view of a support body illustrated in FIG. 4.

FIG. 7 is an arrow A-A sectional view of a support body 242 illustrated in FIG. 4. As illustrated in FIG. 7, a pair of insertion holes 242*b* into which a pair of support shafts 261 are inserted are formed in the support body 242. As illustrated in FIG. 1 and FIG. 2, the insertion hole 242*b* is a through-hole formed so as to extend along the axis X3. The insertion hole 242*b* is preferably formed of a resin material (for example, a fluoroplastic material) to reduce friction between the insertion hole 242*b* and the support shaft 261.

Figure 8:
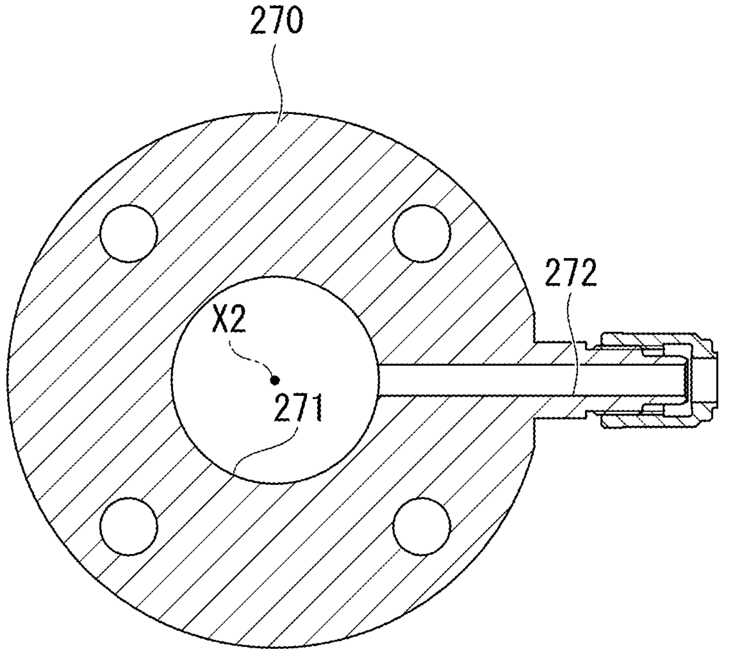
FIG. 8 is an arrow B-B sectional view of a bypass flange illustrated in FIG. 4.

The bypass flange 270 is a member for supplying air (gas) used to check the airtightness of a fluid flow path to the fluid flow path from the pipe L1 to the pipe L2 of the fluid transferring connector 1 in the open state illustrated in FIG. 2. FIG. 8 is an arrow B-B sectional view of the bypass flange 270 illustrated in FIG. 4. As illustrated in FIG. 8, in the bypass flange 270, a through-hole 271 that is a part of a fluid flow path from the pipe L1 to the pipe L2 and an introduction flow path 272 that guides air supplied from an external air supply source (not illustrated) to the through-hole 271 are formed.

Bolts B inserted into a flange F attached to the end of the pipe L2 are fastened to fastening holes (not illustrated) formed in the second accommodation part 220, and thereby the bypass flange 270 is fixed interposed between the flange F and the second accommodation part 220.

The operator supplies air to the introduction flow path 272 of the fluid transferring connector 1 in the open state illustrated in FIG. 2 and thereby supplies air to the fluid flow path from the pipe L1 to the pipe L2 of the fluid transferring connector 1. This enables the operator to check whether or not a state where the air that has flown into the fluid flow path from the pipe L1 to the pipe L2 flows out to outside of the fluid transferring connector 1 (a state where the airtightness is not ensured) is established.

Further, the operator supplies air to the introduction flow path 272 of the fluid transferring connector 1 in the closed state illustrated in FIG. 1 and thereby supplies air to the fluid flow path inside the second valve part 210 of the socket 200. This enables the operator to check whether or not the state where the second valve part 210 of the socket 200 is in contact with the opening hole 220*a* of the second accommodation part 220 and the pipe L1 and the pipe L2 do not communicate with each other is properly maintained.

The effects and advantages achieved by the fluid transferring connector 1 of the present embodiment described above will be described.

According to the fluid transferring connector 1 of the present embodiment, when the operator inserts the plug 100 into the socket 200 and operates the lock mechanism 245 of the plug insertion part 240 of the socket 200, the plug 100 is fixed so as not to move along the axis X2 with respect to the plug insertion part 240. When the plug insertion part 240 is moved toward the second accommodation part 220 along the axis X2 by the motion mechanism 250 with the plug 100 being fixed to the plug insertion part 240, the first valve part 110 of the plug 100 and the second valve part 210 of the socket 200 come into contact with each other. Accordingly, a state where the fluid flows from the pipe L1 on the plug 100 side to the pipe L2 on the socket 200 side is obtained.

According to the fluid transferring connector 1 of the present embodiment, the second accommodation part 220 of the socket 200 is supported by the first support part 230 in a state where the second accommodation part 220 is fixed with respect to the installation face S. Further, the weight of the plug insertion part 240 is supported at a predetermined position Po on the axis X2 of the plug insertion part 240 by the second support part 260. Since the weight of the plug insertion part 240 into which the plug 100 is inserted is supported by the second support part 260, the fluid can be supplied stably without causing bending or breakage in the coupling portion between the plug 100 and the socket 200 compared to a case where the weight of the plug 100 is supported at a position thereof not inserted into the socket 200.

Further, according to the fluid transferring connector 1 of the present embodiment, even when the plug insertion part 240 is moved along the axis X2 by the motion mechanism 250, the state where the predetermined position Po on the axis X2 of the plug insertion part 240 is supported by the second support part 260 is maintained. Thus, even when the center of gravity of the plug insertion part 240 and the plug 100 fixed to the plug insertion part 240 is moved by the motion mechanism 250, the state where the weight of the plug insertion part 240 is supported by the second support part 260 is maintained, and the fluid can be supplied stably without causing bending or breakage in the coupling portion between the plug 100 and the socket 200.

According to the fluid transferring connector 1 of the present embodiment, the operation of switching between the open state where the first valve part 110 and the second valve part 210 are in contact with each other and the closed state where the first valve part 110 and the second valve part 210 are not in contact with each other can be performed by a pressure generated by compressed air without requiring manual operation by the operator.

According to the fluid transferring connector 1 of the present embodiment, the weight of the plug insertion part 240 can be transmitted from the pair of insertion holes 242*b* of the plug insertion part 240 to the installation face S via the pair of support shafts 261 inserted into the pair of insertion holes 242*b*. Further, compared to a case where a single support shaft is inserted into a single insertion hole, force can be prevented from acting in the direction in which the plug insertion part 240 is rotated about the support shaft 261, and thereby the weight of the plug insertion part 240 can be reliably transmitted to the installation face S.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A fluid transferring connector comprising:

a plug configured to be attached to an end of a first pipe, a fluid is allowed to flow through the first pipe; and a socket configured to be connected to a second pipe, the plug being inserted into the socket, and a fluid flowing in from the first pipe is allowed to flow out to the second pipe, wherein the plug includes a first valve part, and a cylindrical first accommodation part that accommodates the first valve part to be movable along a first axis, wherein the socket includes a second valve part, a cylindrical second accommodation part that accommodates the second valve part to be movable along a second axis, a first support part that supports the cylindrical second accommodation part in a state where the cylindrical second accommodation part is fixed with respect to an installation face, a plug insertion part formed cylindrically so as to surround the cylindrical second accommodation part, the plug being inserted into the plug insertion part, a motion mechanism configured to move the plug insertion part along the second axis toward or away from the cylindrical second accommodation part to perform switching between an open state where the first valve part and the second valve part are in contact with each other and a closed state where the first valve part and the second valve part are not in contact with each other, and a second support part that supports the weight of the plug insertion part at a predetermined position on the second axis of the plug insertion part, wherein the plug insertion part includes a lock mechanism configured to fix the plug so that the plug is not moved along the second axis with respect to the plug insertion part, and wherein, when the motion mechanism moves the plug insertion part along the second axis, a state where the predetermined position on the second axis of the plug insertion part is supported by the second support part is maintained.

2. The fluid transferring connector according to claim 1, wherein the motion mechanism is configured to move the plug insertion part along the second axis toward or away from the cylindrical second accommodation part by a pressure generated by a compressed gas.

3. The fluid transferring connector according to claim 1, wherein the second support part includes at least one support shaft fixed to the installation face and arranged along a third axis parallel to the second axis, and wherein the plug insertion part includes at least one insertion hole extending along the third axis, the support shaft being inserted into the insertion hole.

4. The fluid transferring connector according to claim 3, wherein the second support part includes a plurality of support shafts, and wherein the plug insertion part includes a plurality of insertion holes.

* * * * *